US012193405B2

(12) United States Patent
Paulrud et al.

(10) Patent No.: US 12,193,405 B2
(45) Date of Patent: Jan. 14, 2025

(54) MILKING CONTROL ARRANGEMENT AND MILK EXTRACTING SYSTEM

(71) Applicant: DELAVAL HOLDING AB, Tumba (SE)

(72) Inventors: Carl Oskar Paulrud, Tumba (SE); Anders Schuster, Tumba (SE)

(73) Assignee: DeLaval Holding AB, Tumba (SE)

( * ) Notice: Subject to any disclaimer, the term of this patent is extended or adjusted under 35 U.S.C. 154(b) by 102 days.

(21) Appl. No.: 17/912,831

(22) PCT Filed: Mar. 17, 2021

(86) PCT No.: PCT/SE2021/050237
§ 371 (c)(1),
(2) Date: Sep. 19, 2022

(87) PCT Pub. No.: WO2021/188035
PCT Pub. Date: Sep. 23, 2021

(65) Prior Publication Data
US 2023/0142734 A1   May 11, 2023

(30) Foreign Application Priority Data

Mar. 18, 2020 (SE) .................... 2050295-1

(51) Int. Cl.
*A01J 5/01* (2006.01)
*A01J 5/007* (2006.01)

(52) U.S. Cl.
CPC ............... *A01J 5/01* (2013.01); *A01J 5/0075* (2013.01)

(58) Field of Classification Search
CPC .. A01J 5/007; A01J 5/0075; A01J 5/01; A01J 5/47; A01J 5/48; A01J 5/10–16
See application file for complete search history.

(56) References Cited

U.S. PATENT DOCUMENTS

| | | | |
|---|---|---|---|
| 2003/0145794 A1* | 8/2003 | Van Der Lely | A01J 5/0175 119/14.02 |
| 2011/0303155 A1* | 12/2011 | Tucker, Jr. | A01J 5/017 119/14.08 |
| 2014/0000520 A1 | 1/2014 | Bareket | |
| 2015/0022641 A1* | 1/2015 | Hofman | A01J 5/007 348/46 |

(Continued)

FOREIGN PATENT DOCUMENTS

| | | |
|---|---|---|
| CN | 105830933 | 7/2018 |
| DE | 36 09 275 | 9/1987 |

(Continued)

OTHER PUBLICATIONS

Hamann Joern Dr, Method and Device for Deactivating Milk Translation, Jul. 6, 1989 (Year: 1989).*

(Continued)

*Primary Examiner* — Joshua J Michener
*Assistant Examiner* — Nicole Paige MacCrate
(74) *Attorney, Agent, or Firm* — NIXON & VANDERHYE

(57) ABSTRACT

A milking control arrangement and milk extracting system, configured to obtain teat size data of at least one teat of an animal to be milked and to adjust a milking parameter of a milk extraction unit when milk is extracted from the teat based on the obtained teat size data of the teat.

20 Claims, 8 Drawing Sheets

(56) References Cited

U.S. PATENT DOCUMENTS

| | | | | |
|---|---|---|---|---|
| 2015/0040830 | A1* | 2/2015 | Van Leeuwen | A01J 5/08 |
| | | | | 119/14.02 |
| 2015/0289470 | A1* | 10/2015 | Bahlenberg | G06K 7/10366 |
| | | | | 119/14.08 |
| 2018/0049390 | A1* | 2/2018 | Foresman | G06T 7/75 |
| 2019/0191658 | A1* | 6/2019 | Kånge | G06T 7/00 |
| 2020/0260682 | A1* | 8/2020 | Pearson | A01J 5/16 |

FOREIGN PATENT DOCUMENTS

| | | |
|---|---|---|
| DE | 37 42 742 | 7/1989 |
| DE | 10 2005 033 316 | 1/2007 |
| EP | 0 727 137 | 8/1996 |
| EP | 1 104 986 | 6/2001 |
| EP | 1 514 469 | 8/2006 |
| WO | 00/04768 | 2/2000 |
| WO | 2014/098739 | 6/2014 |
| WO | 2018038674 A1 | 3/2018 |

OTHER PUBLICATIONS

Search Report for SE Application No. 2050295-1 dated Oct. 21, 2020, 3 pages.
International Search Report for PCT/SE2021/050237 dated Jun. 17, 2021, 3 pages.
Written Opinion of the ISA for PCT/SE2021/050237 dated Jun. 17, 2021, 6 pages.
Office Action, issued in European Patent Application No. 21714457.5 dated Nov. 22, 2024.

\* cited by examiner

MILKING CONTROL ARRANGEMENT AND MILK EXTRACTING SYSTEM

CROSS-REFERENCE TO RELATED APPLICATIONS

This application is the U.S. national phase of International Application No. PCT/SE2021/050237 filed Mar. 17, 2021 which designated the U.S. and claims priority to SE Patent Application No. 2050295-1 filed Mar. 18, 2020, the entire contents of each of which are hereby incorporated by reference.

TECHNICAL FIELD

This document discloses a milking control arrangement and a milk extracting system. More particularly, a milking control arrangement and a milk extracting system are described, for adjusting a milking parameter of a milk extraction unit, thereby improving milk extraction from a teat having a size or shape deviating from an average size/shape of teats of the herd.

BACKGROUND

On a dairy farm, milk is typically extracted from the animals by putting a teat cup with a liner on a teat of the animal and apply milking vacuum under the tip of the teat, and a pulsation vacuum. Hereby, the rhythmical suckling of a calf is imitated so that sucking by the milking vacuum is interrupted by rhythmical motions, opening and closing of the liner caused by the pulsation vacuum. Consequently, the teats are exposed to massage which stimulates oxytocin release of the animal, which in turn activates the milk ejection reflex. Also, congestion in the teat end is prevented by the applied massage.

However, teats are often different both in size and in shape within the herd, for example depending on race, age of the animal, number of births, situation in the lactation cycle, genetic variations, hormone variations, accidents, provided fodder quality/quantity, temperature, etc. The teat size/shape may be different not only between different animals, but also the teats of a single animal may have different sizes/shapes. The teat size/shape of one specific animal may also vary over time due to for example hormone variations. The teats may even change size and/or shape during the milking process itself, as blood and lymph is accumulated in the teat during the milking.

It is desired to evacuate the milk from the animal fast and as complete as possible while reducing teat congestion and avoid injury on the teats. For achieving these goals, an airtight fitting between the teat and the liner is required in order to avoid or at least minimise liner slip and/or the risk of the teat cup/liner to slide off the teat during pulsation.

A conventional approach is to estimate an average size/shape of the teats of the herd at the farm and apply the same liner to all animals/teats, disregarding the differences in teat size/shape. The result is however a milking process which is suboptimal for the teats that deviate from the average teat configuration.

On the market there are an enormous number and range of liner designs, which all try to achieve the above-mentioned goals. As an example, the diameter of a mouthpiece lip of the liner ranges from 18-27 mm and the bore diameter from 20-28 mm. The reason is mainly due to the variation in teat size and teat configuration among breeds.

In case the liner is too short, the barrel will not have enough space to collapse under the teat leading to inefficient milking, while a too large liner might cause frequent slipping. In case the liner is applied onto a teat having a smaller diameter than the average teat of the herd, that the liner is selected for in order to optimise the milking, severe air slip may result when the milking vacuum is applied, due to insufficient fit between the liner and the teat. The air slip results in reducing the milking vacuum (i.e. increasing the applied under-pressure in comparison with the desired under-pressure/vacuum), leading to inefficient milking of the teat, and possibly even cause the teat cup/liner to slip of the nipple.

A recently developed milking method is called boost. Boost means that the milk extraction starts with applying milking vacuum at a first level and when the milk flow of the teat has increased over a threshold limit, and thereafter increasing the milking vacuum (i.e. lowering the under pressure). In case the liner/teat fit is good, this works fine, but in case of bad fit, the air slip instead precludes increase of the milking vacuum. Thus, the problems of bad fit between the teat and the liner increase when boost is applied.

A potential solution to at least some of the above-mentioned problems is presented in the document WO 00/04768. The solution comprises providing a plurality of sets of teat cups with liners of different sizes at a milking apparatus/robot. The size/shape of a teat of an animal to be milked is analysed and a matching teat cup/liner is applied to it during milk extraction.

The disclosed solution may to some extent solve the above-described problem at least partly, however, the solution will require a large amount of additional teat cups/liners, which adds costs to the milking apparatus, both in additional hardware and in terms of added maintenance costs, in comparison with the conventional one-size-fits-all teat cup/liner concept. The rubber of the liners will age over time when in contact with the milk and the liners have to be replaced at regular time intervals, which will generate both additional costs and more work for the farmer. A more severe disadvantage is that the constant swapping between different liners is time consuming and will extend the required time each animal has to spend in the milking robot/arrangement, thereby reducing the number of animals that can be served by the milking robot/arrangement, compared with the conventional concept.

It appears that further investigations and development is required for improving milk evacuation of animals having deviating teat configurations.

SUMMARY

It is therefore an object of this invention to solve at least some of the above problems and improve milking of an animal.

According to a first aspect of the invention, this objective is achieved by a milking control arrangement configured to obtain teat size data of at least one teat of an animal to be milked. Also, the milking control arrangement is configured to adjust a milking parameter of a milk extraction unit when milk is extracted from the teat, based on the obtained teat size data of the teat.

Thereby, by adapting the milking process to the configuration of the individual teat, the milking could be optimised for the teat instead of an average teat. Thanks to the provided solution, compensation for the differences in teat size, and thereby differences in fit against the liner, could be made mainly by control of adjusted milking parameters which makes the disclosed solution easily implemented. Hereby, the milk extraction is improved.

In an implementation of the milking control arrangement according to the first aspect, the milking control arrangement may also be configured to obtain a milk flow value of the teat when milk is extracted from the teat. Furthermore, the milking control arrangement may be configured to adjust the milking parameter of the milk extraction unit when milk is extracted from the teat, based on the obtained milk flow value of the teat.

By measuring the milk flow value of the teat and adapting one or several milking parameters of the milk extraction unit to the measured milk flow, an adaptation of the milk extraction is made to the constraints of the individual teat, leading to improved milking.

In yet an implementation of the milking control arrangement according to the first aspect, the milking control arrangement may be additionally configured to obtain liner data of a liner of the milk extraction unit, applied to the teat. Also, the milking control arrangement may be configured to adjust the milking parameter of the milk extraction unit when milk is extracted from the teat, based on the obtained liner data of the liner applied to the teat. A liner comprises a barrel that is the part of the liner that is in contact with a teat of an animal during milking. The liner data is associated with the dimensions of the barrel, preferably the diameter of the barrel at one or several cross-sections along a longitudinal axis of the barrel and/or the wall thickness of the barrel at one or several cross-sections along a longitudinal axis of the barrel.

Hereby, differences in teat configuration may be compensated by application of differently shaped respective liners, leading to better fit between liner and teat and reduced slip which makes the milking process more efficient.

In another implementation of the milking control arrangement according to the first aspect, the adjusted milking parameter comprises anyone, or a combination of: a milking vacuum applied to the teat, a pulsation ratio of the applied pulsation pressure, pulsating pressure levels, fixed D-phase/adjustable B-phase.

In another implementation of the milking control arrangement according to the first aspect, the milking control arrangement may also be configured to obtain teat size data of a plurality of teats of the animal and adjust the milking parameter of the milk extraction unit individually for each respective teat from which milk is extracted.

In yet another implementation of the milking control arrangement according to the first aspect, the milking control arrangement may be configured to determine, based on the obtained teat size data, a difference in size between two teats. Also, the milking control arrangement may be configured to adjust the milking parameter of the milk extraction unit by applying different milk flow switch points for adjusting the milking vacuum applied to the respective teat based on the determined difference in size between the two teats.

It thus become possible to have milk flow switch points that are individually adapted to the conditions and ability of each teat, making the milking process more efficient.

In another implementation of the milking control arrangement according to the first aspect, the milking control arrangement may be configured to determine, based on the obtained teat size data, a difference in size between two teats. The milking control arrangement may also be configured to adjust the milking parameter of the milk extraction unit by applying different pulsation ratio of the applied pulsating pressure, or pulsating pressure levels, or B-phase lengths, or milking vacuum applied to the teats based on the determined difference in size between the two teats.

According to a second aspect of the invention, this objective is achieved by a milk extracting system. The milk extracting system comprises a milk extraction unit, configured to extract milk of an animal. The milk extracting system also comprises a milking control arrangement according to the first aspect, or any implementation thereof.

Thereby, by adapting the milking process to the configuration of the individual teat, the milking could be optimised for the teat instead of an average teat. Thanks to the provided solution, compensation for the differences in teat size, and thereby differences in fit against the liner, could be made mainly by control of adjusted milking parameters which makes the disclosed solution easily implemented. Hereby, the milk extraction is improved.

In an implementation of the milk extracting system according to the second aspect, the milk extracting system may also comprise a sensor configured to determine teat size of at least one teat of the animal to be milked.

In another implementation of the milk extracting system according to the second aspect, the milk extracting system may comprise an animal identifying device, configured to identify the animal. The milk extracting system may also comprise a memory device configured to store, associated with an identity reference of the animal, teat size data of teats of the animal, and/or at least one milking parameter to be applied when milk is extracted from a teat of the animal.

In yet another implementation of the milk extracting system according to the second aspect, the milk extracting system may comprise a set of teat cups, comprising at least one first teat cup and at least one second teat cup, wherein the first teat cup comprises a liner that has a different dimension than a liner of the second teat cup.

Other advantages and additional novel features will become apparent from the subsequent detailed description.

FIGURES

Embodiments of the invention will now be described in further detail with reference to the accompanying figures, in which.

Figure 4:
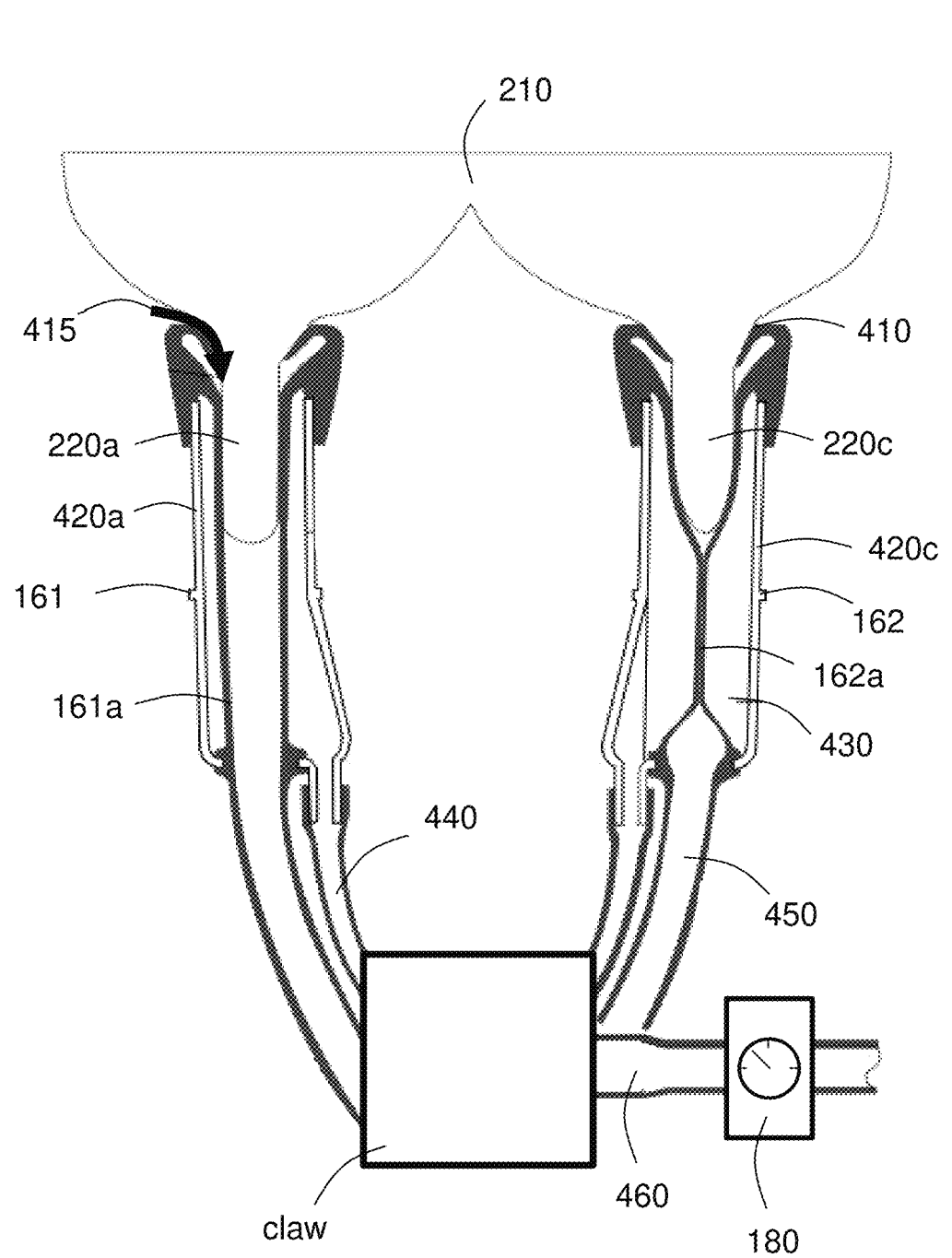

FIG. 4 schematically illustrates a teat cup cluster and therein comprised components.

Figure 5:
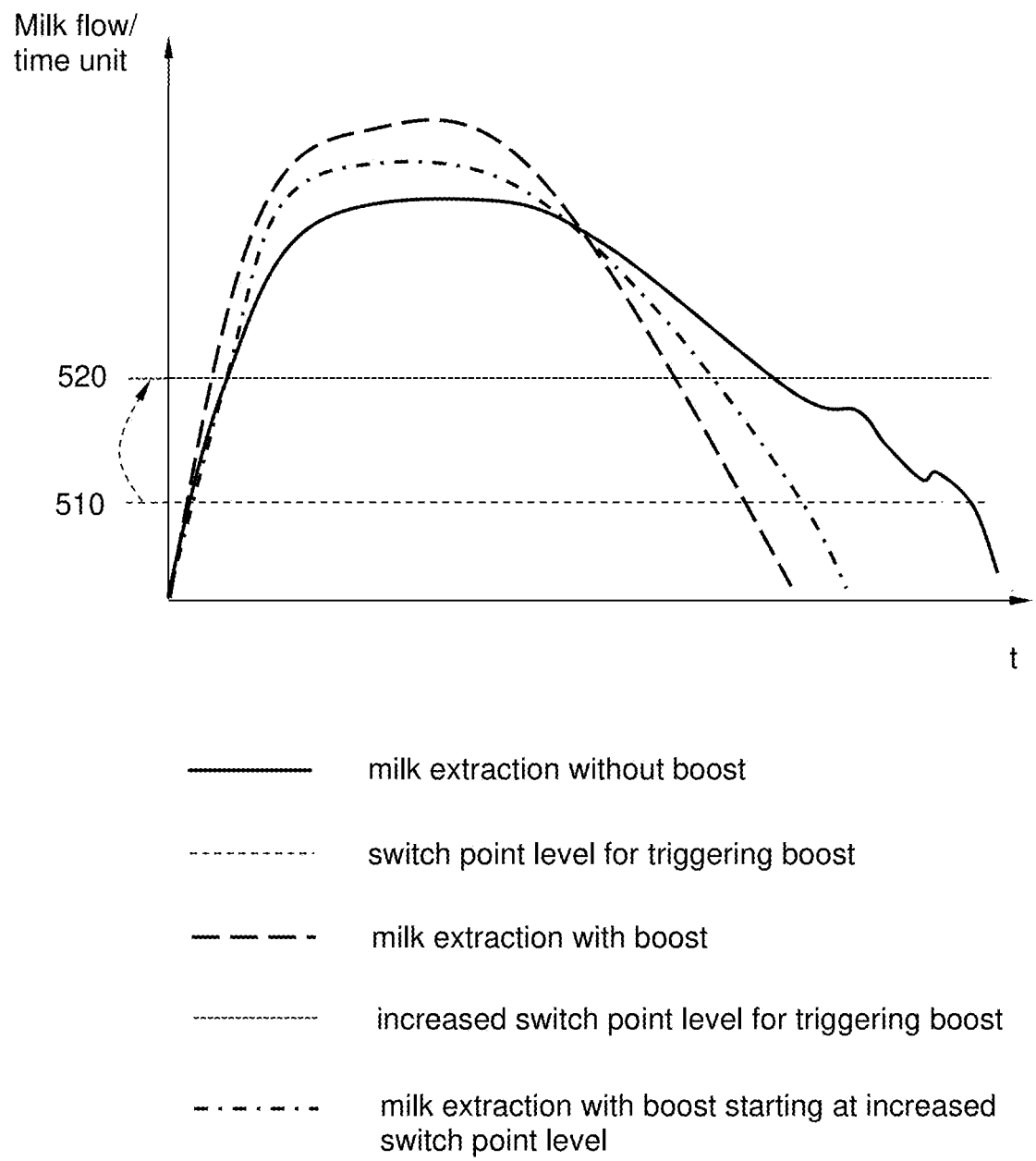

FIG. 5 is a diagram that illustrates examples of milk flow per time unit during milk extraction according to some examples.

Figure 6:
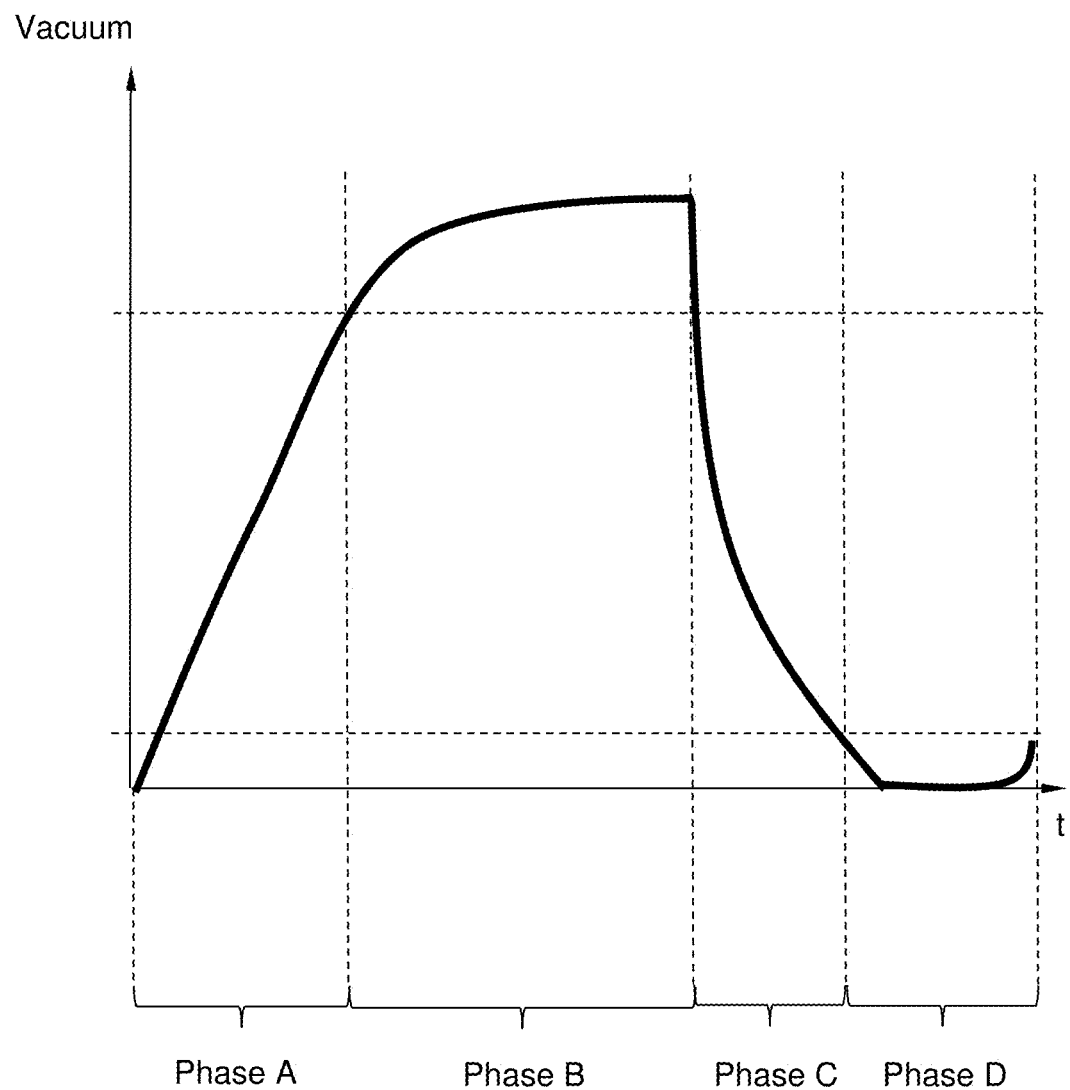

FIG. 6 is a diagram that illustrates an example of a pulsation cycle divided into four different phases A, B, C and D.

DETAILED DESCRIPTION

Embodiments of the invention described herein are defined as a milking control arrangement and a milk extracting system, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
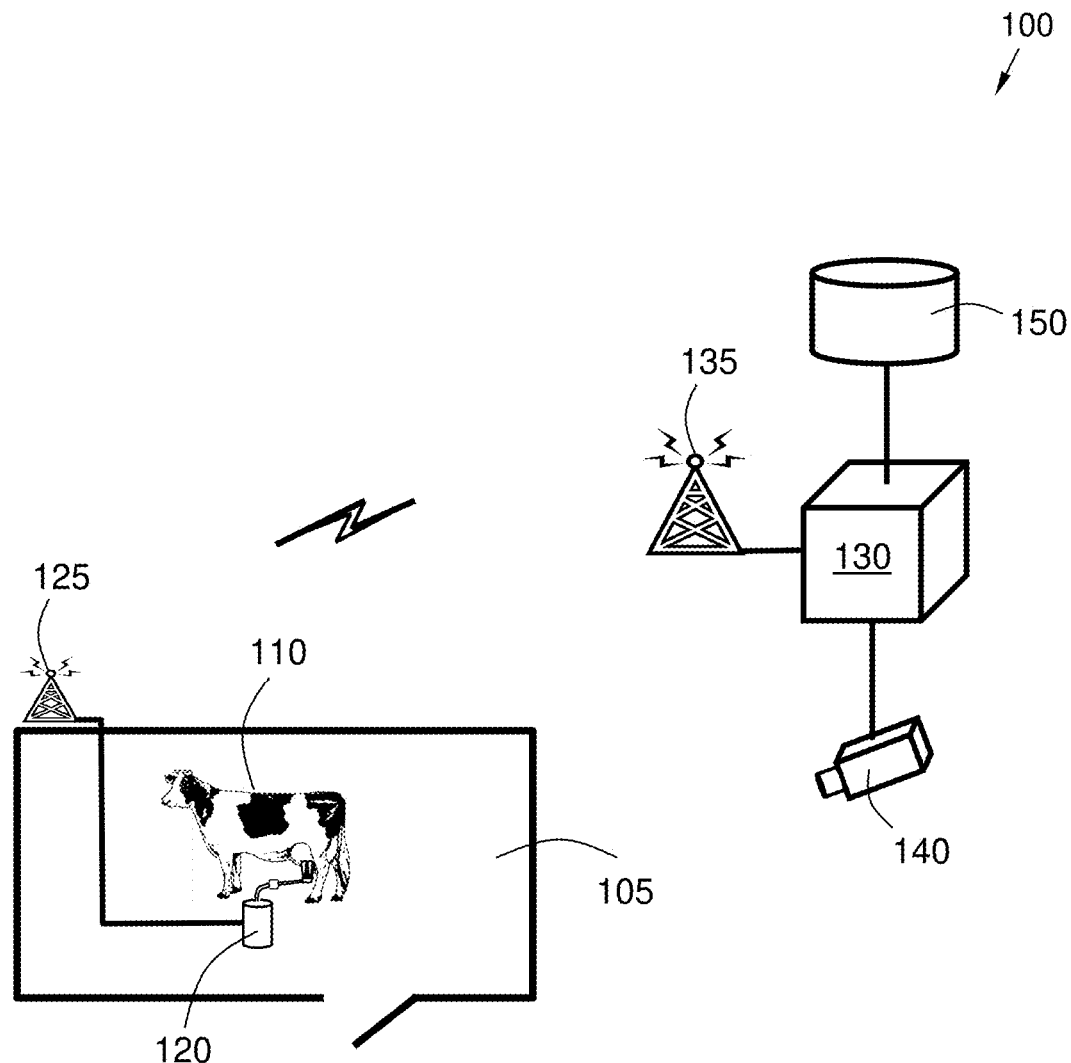
FIG. 1A illustrates a milk extracting system according to an embodiment, in a scenario wherein milk is extracted from the animal.

FIG. 1A illustrates a milk extracting system 100 in a scenario wherein milk is extracted from an animal 110. The animal 110 is comprised in a herd of animals for dairy farming at a farm 105.

"Animal" may be any arbitrary type of domesticated female mammal such as e.g. cow, goat, sheep, camel, horse, dairy buffalo, donkey, yak, etc.

The milk of the animal 110 may be extracted by a milk extraction unit 120 comprised in a rotary milking parlour, in an automated robotic milking system, bucket milking arrangement, a pipeline milking plant or similar, just to mention some few arbitrary examples.

In the illustrated example of the milk extracting system 100, the milk extraction unit 120, and various milking parameters of the milk extraction unit 120 is controlled by a milking control arrangement 130, in this case via a wireless communication interface via a respective transceiver 125, 135.

The milk extracting system 100 may also comprise a sensor 140 which may capture an image, or several images of the teats of the animal 110 to be milked. These images may be provided to the milking control arrangement 130, which may utilise the images for estimating teat size/shape of the teats of the animal 110, and also estimate a deviation size between the determined teat size and a reference teat size/shape of an average teat of an average animal of the herd at the farm.

Based on the obtained teat size data of the teats of the animal 110 to be milked, the milking control arrangement 130 may determine an appropriate milking parameter for the milk extraction unit 120 to apply when milk is extracted from the respective teats.

The adjusted milking parameter may for example comprise anyone, or a combination of: a milking vacuum applied to the teat, a pulsation ratio of the applied pulsation pressure, pulsating pressure levels, and/or fixed D-phase/adjustable B-phase.

"Milking vacuum" in the current context refers to the vacuum, or under-pressure, used to extract milk from the teats.

In some embodiments, the milk extracting system 100 may comprise a database 150, in turn comprised in or attached to the milking control arrangement 130. Various data such as appropriate milking parameters to apply by the milk extraction unit 120 for different teats may be stored, associated with teat data, i.e. teat size such as teat diameter, teat length and/or teat shape. The milking control arrangement 130 may, when having determined teat configuration, use the teat data as input value in the database 150 and achieve the appropriate milking parameter in return, which then may be sent to the milk extraction unit 120 via the wireless transceivers 125, 135.

In other embodiments, the database 150 may comprise appropriate milking parameters, associated with an identity reference of an animal 110, and/or a specific teat of the animal 110. By determining the identity of the animal 110 to be milked, by the sensor 140 or by some other animal identifying device, the milking control arrangement 130 may use the identity reference of the animal 110 as an input value for achieving the appropriate milking parameters to apply, which then may be provided to the milk extraction unit 120.

A general inventive concept is to obtain teat size data of at least one teat of the animal 110 to be milked, for example based on sensor detection by the sensor 140, by determining an identity of the animal 110 and obtainment of teat size data stored associated with an animal identity reference of the database 150, by obtaining an estimation of teat size made by an agricultural manager, etc.

Based on the obtained teat size data of the teat/-s, a milking parameter of the milk extraction unit 120 is adjusted when milk is extracted from the teat.

The milking parameter to be adjusted may comprise one or more of a milking vacuum level applied to the teat, a pulsation ratio of the applied pulsation pressure, pulsating pressure levels, fixed D-phase/adjustable B-phase.

By adjusting the milking parameter during milk extraction depending on the size and shape of the teat, previously discussed disadvantages enumerated in the background section could be eliminated, or at least reduced. For example, lowering the applied milking vacuum (in comparison with milking of an average teat) leads to avoidance of air slip, and/or avoidance of that the teat cup slips of the teat, thereby making the milking process more efficient.

The concept of average teat may be regarded as an estimated average size/shape of the teats of the herd at the farm.

In some embodiments, the pulsation pressure levels may be adjusted based on size and shape of the teat, and milk flow value of the teat when milk is extracted from the teat.

Thanks to the provided solution, it is possible to dynamically adjust the milking vacuum of each teat depending on the teat size data, so that an increased milking vacuum may be applied when the fit between the liner and teat is good and vice versa. Thereby the milking efficiency is improved, by reducing the milking time per animal 110 and also by reducing the risk of air slip between the liner and the teat. It is also estimated that teat condition of the animal 110 is increased.

Figure 1B:
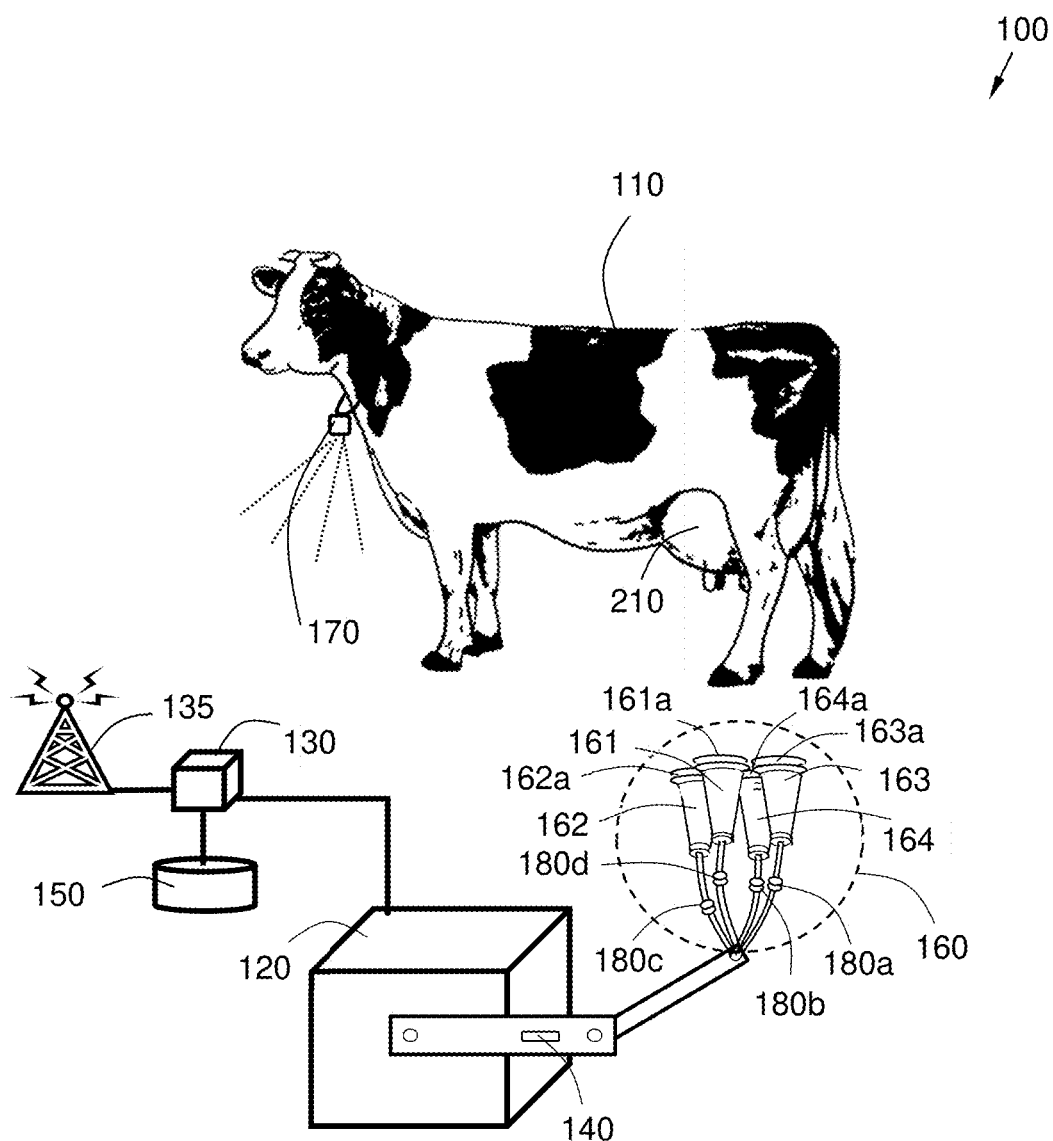
FIG. 1B illustrates a milk extracting system according to another embodiment, in a scenario wherein milk is extracted from the animal.

FIG. 1B also illustrates a milk extracting system 100 in a scenario wherein milk is extracted from an animal 110. The animal 110 is comprised in a herd of animals for dairy farming at a farm 105.

The animal 110 typically has an udder 210, comprising a set of teats. The number of teats on the udder 210 is different for different species of animals 110; for example, a sow has normally 16 teats, a cow has 4 while a sheep or a goat have 2, etc.

In the illustrated embodiment, the milk extraction unit 120 is embodied as a milking robot, which may be part of an Automatic Milking System (AMS), sometimes also referred to as a Voluntary Milking System (VMS). The milk extraction unit 120 may comprise a cluster of teat cups 160, which in turn comprises a plurality of teat cups 161, 162, 163, 164, which each one is configured for holding a liner 161a, 162a, 163a, 164a.

The liner 161a, 162a, 163a, 164a is the only part of the milk extraction unit 120 which is in direct contact with the teat. Design/selection of the liner 161a, 162a, 163a, 164a therefore is important for optimal milking and teat treatment. The liner selection may be made by estimating an average teat size/shape of the herd. All the selected liners 161a, 162a, 163a, 164a may be of the same size, or of different sizes in different embodiments.

When the animals 110 are cows of Holstein Friesian race, it has been observed that the two frontal teats often are longer and thicker than the two rear teats (in about 70% of the observations). Thus, the two liners 161a, 162a applied on the two frontal teat cups 161, 162 may have a larger dimension than the two liners 163a, 164a applied on the two rear teat cups 163, 164, to be better adapted to the actual teats of the Holstein Friesian cow.

Thus, the liners 161a, 162a, 163a, 164a may be selected to fit an average teat of the herd at the farm 105.

In some embodiments, the farm 105 may have several milk extraction units 120 (milking robots), which may have different liner sizes. The different milk extraction units 120 may thus be dedicated to animals 110 having teats of different sizes, i.e. small teats animals may only be welcome at a first milk extraction unit 120 while big teats animals are directed towards a second milk extraction unit 120. Hereby, an improved fit between liner 161a, 162a, 163a, 164a and teat is achieved, reducing the problems of bad fit during milk extraction, i.e. strip yield, liner slip, milking time, teat treatment and udder health.

The milk flow during extraction of milk may be measured for example by a milk flow meter 180a, 180b, 180c, 180d measuring the milk flow from each individual teat; or alternatively one common milk flow meter for the cluster unit, measuring the milk flow of all the teats of the udder 210.

The animal 110 may be identified by an animal identifying device 170 which may be attached to the animal 110 in some embodiments, e.g. in a necklace around the neck of the animal 110, under the hide of the animal 110, as ear tag/-s, around the tail of the animal 110 and/or around any, some or all of the legs of the animal 110, etc.

The animal identifying device 170 may comprise a transponder, such as a Radio-Frequency Identification (RFID) device in some embodiments. The transponder comprises electronically stored information for uniquely identifying the animal 110. Such transponder may be active or passive. An active transponder comprises, or is attached to, a local power source such as a battery and may operate at hundreds of meters from a reader 135. A passive transponder collect energy from a nearby reader's 135 interrogating radio waves. Thereby, no local power source is required in a passive transponder.

The reader 135 may then provide the identity of the animal 110, as obtained from the identification device 170, to the milking control arrangement 130, over a wired or wireless communication interface.

Figure 2A:
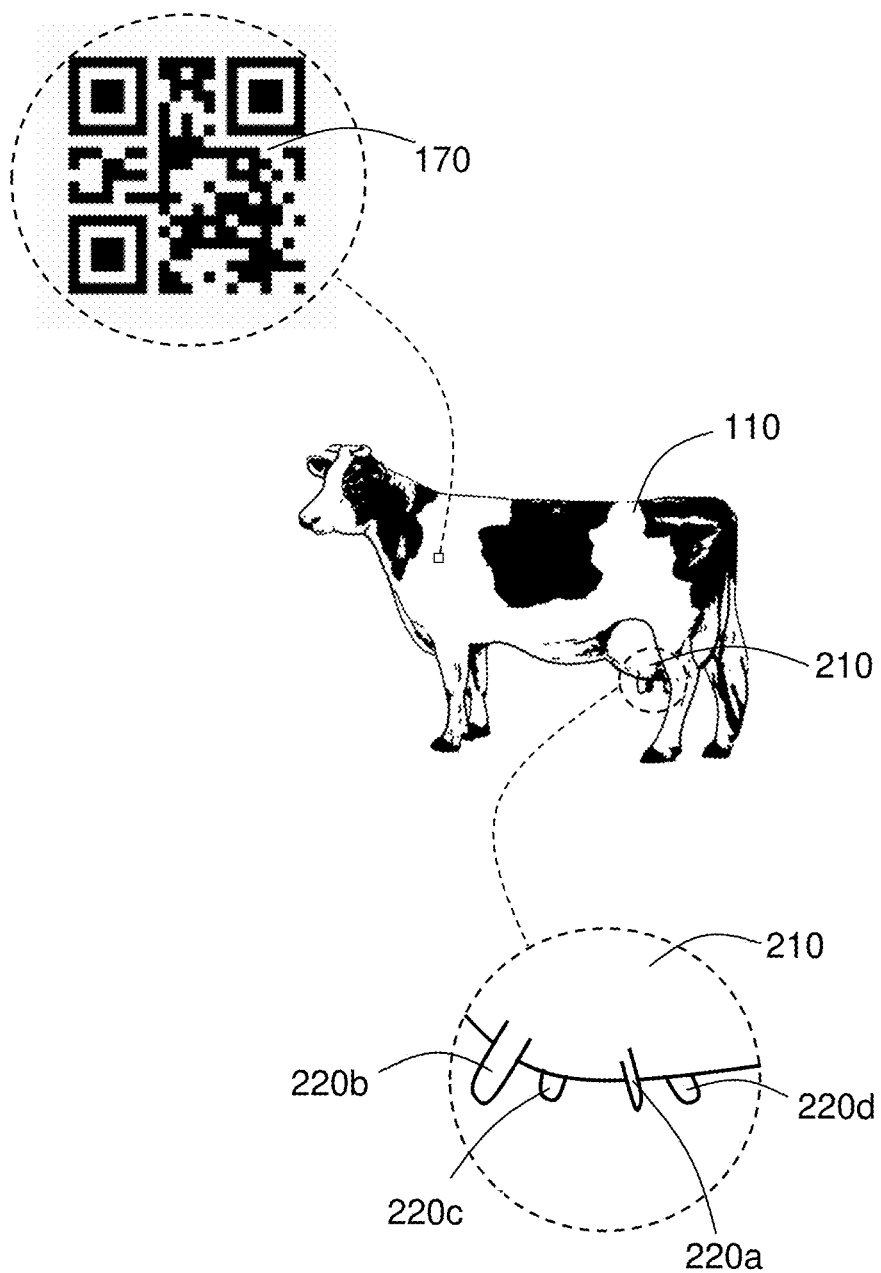
FIG. 2A illustrates an identification means of an animal and an udder with one teat deviating from the other teats in size and shape.

In some alternative embodiments, the animal identifying device 170 may comprise an identification number, which may be recognised by the sensor 140, or possibly a separate camera or scanner, in cooperation with an image recognition program of the milking control arrangement 130, as illustrated in FIG. 2A. In some further embodiments, the animal identifying device 170 may comprise the identification number encoded in a graphic encoding such as e.g. barcode, European Article Number (EAN) code, data matrix, Quick Response (QR) code. Any other convenient method for identification may be utilised in some embodiments.

In yet some embodiments, the animal 110 may be identified based on the pattern of markings or tattoos in the animal skin, as determined by the sensor/camera 140 (or another sensor) of the farm 105 and a comparison may be made with a register over pre-stored patterns of animals in the herd. The animal 110 may alternatively be identified by the colour markings of the hide, analysed by an image recognition program of the milking control arrangement 130.

Figure 2B:
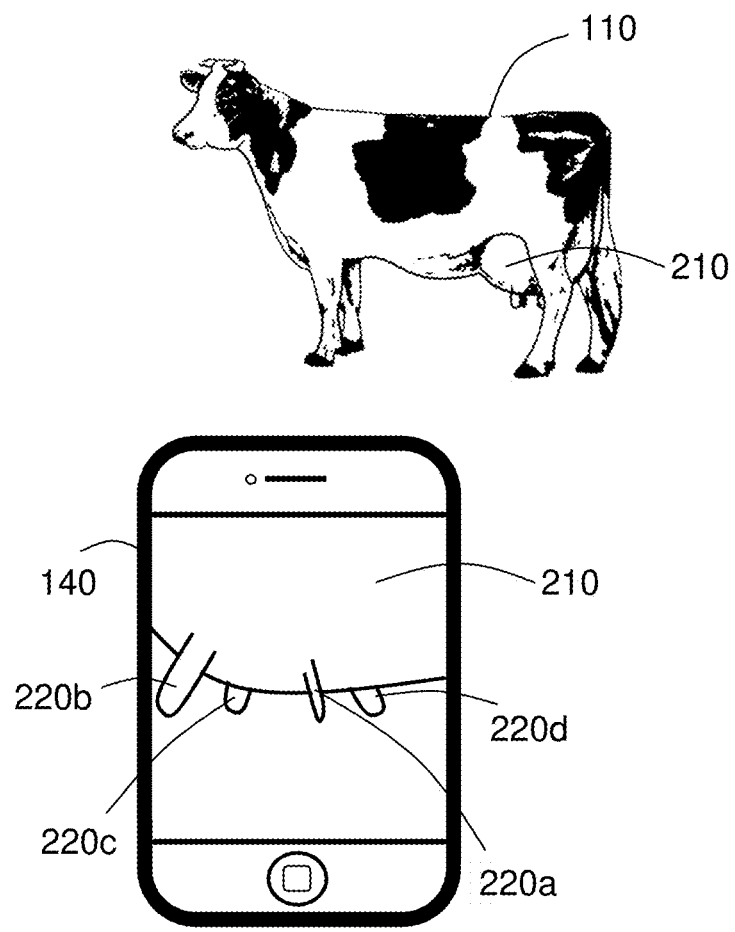
FIG. 2B illustrates a device for determining teat size data and thereby detecting a teat deviating from the other teats in size and shape.

FIG. 2B schematically illustrates an embodiment wherein the sensor 140 is embodied as a mobile phone. The farmer may download an app to his/her mobile phone and direct the mobile phone/sensor 140 towards the udder 210 of the animal 110. An image recognition program of the app may estimate teat size data such as size (length and diameter) and shape of the teats 220a, 220b, 220c, 220d. This data may be provided to the milking control arrangement 130 associated with an identity reference of the animal 110, for storage in the database 150.

Alternatively, the image recognition program of the app may provide information concerning the animal teats only for a teat 220a deviating from an average teat size 220b, 220c, 220d. It may then be assumed that non commented teats are classified as being of average size/shape, in some embodiments, thereby saving information transmission and data storage requirements.

Figure 3:
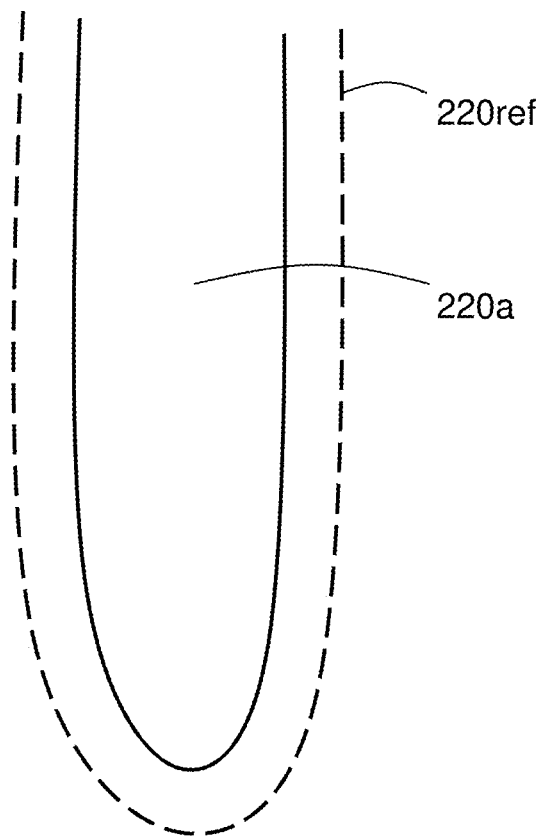
FIG. 3 illustrates an arbitrary example of a detected difference in size and shape of a certain teat and a herd average teat, used as reference teat.

FIG. 3 illustrates a detected teat 220a having a deviating dimension than a reference teat size 220ref, representing an average teat size of the herd.

The liner 161a, 162a, 163a, 164a may be selected to fit the average teat, of the reference teat size 220ref. Thereby air slip is avoided for the majority of teats 220a, 220b, 220c, 220d of the animals 110 at the farm. The target of the disclosed solution is to avoid or at least minimise air slip of a teat deviating in configuration, i.e. size and/or shape of the teat 220a, 220b, 220c, 220d.

FIG. 4 illustrates a cutaway view of a teat cup cluster 160 comprising teat cups 161, 162, 163, 164 and some components comprised therein. The teat cup cluster 160 forms a part of a milk extraction unit 120. The teat cup cluster 160 comprises a mouthpiece 410 with an enclosed mouthpiece chamber. It is desired to select liner 161a, 162a, 163a, 164a ascertaining a substantially airtight seal of the respective teat 220a, 220c. The left part of FIG. 4 schematically illustrates the shape of the liner 161a, 162a, 163a, 164a during milk extraction, B phase of the animal 110 and the right part of FIG. 4 schematically illustrates the shape of the liner 161a, 162a, 163a, 164a when it is collapsing during the rest phase D.

A consequence may otherwise be that air enters the liner 161a, 162a, 163a, 164a during the milk extraction (i.e. air slip 415), when milking vacuum is applied under the teat 220a, 220c. Air may enter the liner 161a, 162a, 163a, 164a via the mouthpiece 410, thereby reducing the under-pressure (milking vacuum) under the teats 220a, 220c. The teat cup 161, 162, 163, 164 comprises a respective shell 420a, 420c forming the outer structure of the teat cup 161, 162, 163, 164, configured to hold the liner 161a, 162a, 163a, 164a.

The milking vacuum is applied to the teat 220a, 220c via a short milk tube 450 of each respective teat cup 161, 162, 163, 164, which propagate the milk further to the long milk tube 460, which in turn forward the milk to a milk tank. The milk flow may be measured via the milk flow meter 180, here applied on the long milk tube 460, measuring the milk flow from all the teats 220a, 220b, 220c, 220d of the animal 110.

The teat cup cluster 160 may comprise a manner of controlled air intake, e.g. an air vent, which may be applied on the claw, on the short pulse tube 440 or on some other convenient location.

Pulsating pressure levels are applied to the pulsation chamber 430 via a short pulse tube 440, thereby rhythmically alternating between milk extraction/B phase and rest phase D, as illustrated in the left/right respective parts of FIG. 4. Hereby the liner 161a, 162a, 163a, 164a will periodically open (at least to some extent) and collapse. The pulsating pressure levels applied to the pulsation chamber 430 via the short pulse tube 440 may in some embodiments vary between a pressure higher than the milking vacuum, such as e.g. atmospheric pressure, during the rest phase D while the pressure level during the milking phase B may be equal to, or higher (i.e. less under-pressure) than the milking vacuum in different embodiments.

An advantage by selecting a pulsating pressure level during the milking phase B that is higher than the milking vacuum is that the liner 161a then is exercising a radial pressure on the teat 220 also during the milking phase B, however not as large as during the rest phase D when the liner 161a is allowed to collapse under the teat 220. The radial pressure on the teat 220 serves as a seal, eliminating or at least reducing air slip 415, also for a deviating teat 220a for which the selected liner 161a is not optimal.

In some embodiments, one of the pulsating pressure levels in the pulsation chamber 430 may be e.g. 60-80% of the milking vacuum for teats of deviating teat size/shape. In case the milking vacuum is 45 kPa, the pulsating pressure level may be 35 kPa respective atmospheric pressure.

Thus, sucking is interrupted by rhythmical motions, opening and closing, of the liner 161a, 162a, 163a, 164a. The force exerted by the collapsed liner 161a, 162a, 163a, 164a causes a massage to the teat. Consequently, the teats 220a, 220b, 220c, 220d are exposed to massage and congestion (e.g. of blood) in the teat end is prevented while oxytocin release and milk ejection is stimulated by the tactical movements of the collapsing and opening liner in combination with the applied milking vacuum, mimicking calf suckling.

The liners 161a, 162a, 163a, 164a may be made of different elastic materials, such as natural or synthetic rubber or silicone, or TPE (Thermo Plastic Elastomere), having different properties. The material used in the liner 161a, 162a, 163a, 164a may be selected based on the applied milking vacuum, which in turn may be dependent on the teat size data.

Principally, when the teat 220a, 220b, 220c, 220d has entered the liner 161a, 162a, 163a, 164a it stretches out vertically to about 100-200% of its premilking length under the influence of the milking vacuum.

FIG. 5 illustrates some examples of flow-controlled milking. It is desired to empty the udder 210 of the animal 110 as efficiently and sometimes as completely as possible, during as short time as possible (to allow for more animals per time unit to be served by the milk extraction unit 120) while stimulating the teats 220a, 220b, 220c, 220d properly, without harming or hurting the teats 220a, 220b, 220c, 220d. A methodology that has been developed to satisfy these demands is referred to as "boost", a kind of milk-flow controlled milking.

The graph in FIG. 5 illustrates three examples of milk extraction flow; milk extraction without boost, milk extraction with boost and milk extraction with boost starting at increased milk flow level. Also, a switch point level 510 for triggering boost and an increased switch point level 520 for triggering boost are illustrated in the graph. In udder milking, the switch point level 510 may be set to about 2 kg milk per minute while the increased switch point level 520 may be set to about 3 kg milk per minute.

Udder milking concerns the sum of milk extraction from all the teats 220a, 220b, 220c, 220d of the udder 210, which may be measured by a flow metre in/on the long milk tube 460, leading the extracted milk from the teat cup cluster 160 to the milk cistern of the farm.

In contrast, quarter milking, which also may be exercised in some embodiments, concerns milk flow from each individual teat 220a, 220b, 220c, 220d of the animal 110. The milk flow in quarter milking is measured by a flow metre in/on each short milk tube 450 of each respective teat cup 161, 162, 163, 164.

During the first seconds of milking, the milk flow may be low, reaching e.g. a value of a few hundred grams of milk per minute. This may be due to insufficient stimulation (sometimes referred to as pre stimulation) of the milk ejection reflex of the animal 110, and/or due to too short time period having passed from beginning of the teat stimulation, i.e. alveoli milk has not started to flow.

Nerve receptors in the skin of the teat are sensitive to pressure. Mechanical stimulation of the teat causes impulse transmission to the pituitary gland in the brain of the animal 110 whereby the hormone oxytocin is released. The hormone is transported to the udder via the blood. The time it takes between the first stimulation of the teat and milk letdown may be about 30-60 seconds but may vary between animals.

The milk ejection reflex, including oxytocin secretion, may also/additionally be stimulated by psychological factors such as by the presence, sight, smell and/or hearing of calves and/or by associating the milking equipment and/or procedures of milking (e.g. feeding concentrate), with milk ejection due to conditioning, or "Pavlov's dog effect".

During a high flow phase, i.e. the peak in the middle of the graphs, the milk flow reaches much higher values, such as for example 3-6 kg milk per minute during udder milking.

At the end of the milking, the milk flow is decreased as the alveoli milk of the udder 210 is decreased due to the extraction.

During milk extraction without boost, the milking vacuum level is kept, either at a constant level throughout milking independently of the milk flow per time unit of the milked animal 110, or by applying an entry vacuum, which is lower than the milking vacuum, until the alveoli milk is released. An advantage with the latter vacuum level adjustment is that the entry vacuum prevents the teat cups 161, 162, 163, 164 to slip off, and that the teats 220a, 220b, 220c, 220d are additionally stimulated (triggering oxytocin release). The milking vacuum level may for example be about 45 kPa while the entry vacuum may be about 35 kPa (non-limiting examples). The milking vacuum level is kept constant during the main milking phase, i.e. when alveoli milk is flowing.

When milking is made with boost, an adaptation of a milking parameter such as the milking vacuum level is made during the main milking phase when alveoli milk is flowing. The adaptation is made to the variation in milk flow during the complete milking and possibly also to the different udder quarters, i.e. teats 220a, 220b, 220c, 220d. A lower vacuum, for example about 40-44 kPa may then be applied in the beginning of the milking, when the milk flow is below the switch point level 510.

When the milk flow of the animal 110 has increased and is reaching the switch point level 510, the milking vacuum may be increased with for example 10% up to 46-50 kPa (i.e.

larger under-pressure). Hereby, milk may be extracted more rationally, at a shorter time than when extracted without boost. The switch point level 510 may be set to e.g. 2 kg milk per minute in udder milking. This may correspond to about 0.8 kg milk per minute, per teat in quarter milking.

The high milk flow of the teat is the reason why the milking vacuum could be increased without causing harm to the teat.

The boost may be applied based on the milk flow on udder level in udder milking in some embodiments. An advantage therewith is that only one flow sensor and one sensor reading is required.

In other embodiments, the boost may be applied based on the milk flow on quarter milking level. The switch point level 510 may then be set to e.g. 0.5 kg milk per minute, per teat, and the increased switch point level 520 may be set to about 0.8 kg milk per minute, per teat.

An advantage therewith is that the increased milking vacuum of the boost is applied at a moment when the milk flow of the particular teat 220a, 220b, 220c, 220d is at an appropriate level for that teat 220a, 220b, 220c, 220d for enabling an increased milking vacuum to extract the milk.

When a teat 220a, 220b, 220c, 220d with a configuration (size and/or shape) deviating from the average/reference teat 220ref, it may not be feasible to apply the increased milking vacuum at the switch point level 510, as this may lead to the previously mentioned inconveniences such as air slip 415 etc. The boost may then instead be applied at an increased switch point level 520; and/or not be applied at all, according to different embodiments. The increased switch point level 520 may be set to e.g. 3 kg milk per minute in udder milking, approximately corresponding to about 1.2 kg milk per minute, per teat in quarter milking. Thereby the boost application may be applied selectively, depending on the nature and the extent of the teat deviation of the individual teat, leading to efficient, yet teat friendly milk extraction.

In some embodiments, the increased switch point level 520 may change a pulsation ratio of the applied pulsation pressure. The four different phases A, B, C, and D of the pulsation cycle are illustrated in FIG. 6.

During phase A, the opening phase, the liner 161a, 162a, 163a, 164a starts to open resulting in milk flowing from the teat 220a, 220b, 220c, 220d. During phase B, the milking phase, the milk continues to flow. The following phase C, the teat cup liner starts to collapse, and milk is prevented from flowing from the teat 220a, 220b, 220c, 220d. The last phase, D, the massage phase or resting phase, the liner 161a, 162a, 163a, 164a is collapsed. The liner movement during a pulsation cycle results in milk extraction and udder massage, stimulating flow of alveoli milk.

The ratio of the respective phases A-D may be different in different implementations; and may also be different depending on teat size/shape of the teat 220a, 220b, 220c, 220d to be milked in some embodiments.

The proportions of the phases A-D, in particular between the resting phase D and the milk extraction phase B may be adapted to the obtained teat size data and the milk flow per time unit of the teat 220a, 220b, 220c, 220d. Thus, the ratio may comprise an extended phase D, rest phase, when the milk flow of the teat is lower than the increased switch point level 520. When the milk flow of the teat exceeds the increased switch point level 520, the milk extraction phase B may be proportionally extended.

In some embodiments, the rest phase, phase D may be kept fixed while the milk extraction phase B may be adjusted, based on the milk flow of the teat 220a.

In yet some embodiments, the pulsating pressure levels may be adjusted for the teat 220a, based on the obtained teat size data of the teat 220a.

When the teat 220a is deviating in configuration, i.e. size and/or shape from the average/reference teat 220ref more than a threshold limit, the pulsating pressure levels may be adjusted, as already briefly discussed in conjunction with the description of FIG. 4.

For example, when the teat 220a has a diameter approximately corresponding with the diameter of the average/reference teat 220ref, i.e. not having a deviating configuration, the pulsating pressure level may be set to the milking vacuum during the B phase and to atmospheric pressure during the D phase.

However, when the teat 220a has a diameter which is more than e.g. 6 mm (or some other predetermined or configurable threshold limit) smaller than the diameter of the average/reference teat 220ref, the pulsating pressure level may be set to about 60-80% of milking vacuum during the B phase and to atmospheric pressure during the D phase, depending among other things on the flexibility/stiffness and other properties of the liner 161a. The liner 161a is thereby continuously exercising a certain radial pressure on the teat 220a over the pulsation cycle, also during the milking phase B leading to avoided air slip 415. It is also avoided that the teat cup 161, 162, 163, 164 slips of the teat 220a. The milking vacuum may be set to about 40-45 kPa.

The pulsating pressure levels applied to the teat 220a may according to these embodiments be adjusted between two distinct pressure levels during a pulsation cycle, which both are higher than the milking vacuum, such as for example variating between about 60-80% of the milking vacuum during the B phase and atmospheric pressure during the D phase.

In some embodiments, the pulsating pressure levels may be adjusted for the teat 220a, based on both the obtained teat size data of the teat 220a and the milk flow per time unit of the teat 220a.

When the teat 220a is determined to have a deviating configuration, i.e. size and/or shape, the pulsating pressure level may be set to about 60-80% of milking vacuum during the B phase and to atmospheric pressure during the D phase. When the milk flow of the teat 220a is reaching the increased switch point level 520, the boost is triggered, and the milking vacuum is increased by about 5-20%, up to for example about 48-55 kPa. The pulsating pressure level may then also be increased correspondingly during the B phase, with about 5-20%, so that the pulsating pressure level still is about 60-80% of the milking vacuum during the B phase. The pulsating pressure level during the D phase may be set to atmospheric pressure.

The terminology used in the description of the embodiments as illustrated in the accompanying drawings is not intended to be limiting of the described milking control arrangement 130, milk extracting system 100, and/or milking method. Various changes, substitutions and/or alterations may be made, without departing from invention embodiments as defined by the appended claims. The various illustrated embodiments depicted in FIGS. 1-6, discussed in the corresponding respective section of the description may with advantage be combined with each other, for example by mixing and compiling features of some or all of the described embodiments, thereby achieving additional advantages.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage.

The invention claimed is:

1. A milking control arrangement (130), configured to:
obtain teat size data of at least one teat of an animal (110) to be milked based on sensor detection by a sensor (140) configured to determine a teat size of the at least one teat of the animal, wherein the teat size data comprises at least one of teat diameter, teat length, and teat shape of the at least one teat of the animal to be milked;
adjust a milking parameter of a milk extraction unit (120) when milk is extracted from the at least one teat, based on the obtained teat size data of the at least one teat,
wherein the adjusted milking parameter includes one or more of the group consisting of: a non-zero value of a milking vacuum applied to the at least one teat, a pulsation ratio of the applied pulsation pressure, a pulsating pressure level, and implementation of fixed D-phase and adjustable B-phase pulsation cycles.

2. The milking control arrangement (130) according to claim 1, further configured to:
obtain teat size data of a plurality of teats of the animal to be milked (110) and adjust the milking parameter of the milk extraction unit (120) individually for each one of the teats from which milk is extracted.

3. The milking control arrangement (130) according to claim 2, further configured to:
determine, based on the obtained teat size data, a difference in size between two of said teats; and
adjust the milking parameter of the milk extraction unit (120) by applying different milk flow switch points (510, 520) that adjust the milking vacuum applied to each one of the two teats based on the determined difference in size between the two teats.

4. The milking control arrangement (130) according to claim 2, further configured to:
determine, based on the obtained teat size data, a difference in size between two of said teats; and
adjust the milking parameter of the milk extraction unit (120) by applying to the two teats, based on the determined difference in size between the two teats, any of:
different pulsation ratios of an applied pulsating pressure,
different pulsating pressure levels,
different B-phase lengths, and
different milking vacuums.

5. The milking control arrangement (130) according to claim 1, further configured to:
obtain a milk flow value of the at least one teat when milk is extracted from the at least one teat; and
further adjust the milking parameter of the milk extraction unit (120) when milk is extracted from the at least one teat, based on the obtained milk flow value of the at least one teat.

6. The milking control arrangement (130) according to claim 1, further configured to:
obtain liner data of a liner of the milk extraction unit (120) that extracts milk from the at least one teat; and
further adjust the milking parameter of the milk extraction unit (120) when milk is extracted from the at least one teat, based on the obtained liner data of the liner that extracts milk from the at least one teat.

7. The milking control arrangement (130) according to claim 1, wherein the adjusted milking parameter is the milking vacuum applied to the at least one teat.

8. The milking control arrangement (130) according to claim 1, wherein the adjusted milking parameter comprises pulsating pressure levels applied to the at least one teat, said pulsating pressure levels adjusted between two distinct pressure levels during a pulsation cycle, both of the two distinct pressure levels being higher than the milking vacuum.

9. The milking control arrangement (130) according to claim 1, wherein the sensor is a camera.

10. The milking control arrangement (130) according to claim 1, wherein the teat size data comprises each of teat diameter, teat length, and teat shape.

11. The milking control arrangement (130) according to claim 1, wherein the teat size data comprises the teat diameter.

12. The milking control arrangement (130) according to claim 1, wherein the wherein the teat size data comprises the teat length.

13. The milking control arrangement (130) according to claim 1, wherein the teat size data comprises the teat shape.

14. The milking control arrangement (130) according to claim 1, wherein the teat size data comprises the teat diameter and the teat length.

15. The milking control arrangement (130) according to claim 1, being further configured to, prior to adjusting the milking parameter and based on the obtained teat size data of the at least one teat, determine an appropriate milking parameter for the milk extraction unit (120) to apply when milk is extracted from the at least one teat of the animal,
wherein the determined appropriate milking parameter is used in the adjusting of the milking parameter of the milk extraction unit (120).

16. A milk extracting system (100), comprising:
a milk extraction unit (120), configured to extract milk from at least one teat of an animal (110);
a sensor (140) configured to determine a teat size of the at least one teat of the animal (110) to be milked; and
a milking control arrangement (130) in operational communication with the milk extraction unit (120), the milking control arrangement (130) configured to:
obtain teat size data of the at least one teat of the animal (110) to be milked, based on sensor detection of the at least one teat by the sensor (140), wherein the teat size data comprises at least one of teat diameter, teat length, and teat shape of the animal to be milked; and
based on the obtained teat size data of the at least one teat, adjust a milking parameter of the milk extraction unit (120) when milk is extracted from the at least one teat of the animal, wherein the adjusted milking parameter includes one or more of the group consisting of: a non-zero value of a milking vacuum applied to the at least one teat, a pulsation ratio of the applied pulsation pressure, a pulsating pressure level, and implementation of fixed D-phase and adjustable B-phase pulsation cycles.

17. The milk extracting system (100) according to claim 16, comprising:
an animal identifying device (170), configured to identify the animal (110); and
a memory device (150) configured to store, associated with an identity reference of the animal (110) at least one of:
 teat size data of teats of the animal (110), and
 at least one milking parameter to be applied when milk is extracted from a teat of the animal (110).

18. The milk extracting system (100) according to claim 16, wherein the milk extraction unit (120) comprises a set of teat cups (160) comprising at least one first teat cup and at least one second teat cup, wherein the first teat cup comprises a liner that has a different dimension than a liner of the second teat cup.

19. The milk extracting system (100) according to claim 16, wherein the sensor is a camera.

20. The milk extracting system (100) according to claim 16, wherein the adjusted milking parameter is the milking vacuum applied to the at least one teat.

* * * * *